United States Patent [19]
Negrin

[11] Patent Number: 5,487,596
[45] Date of Patent: Jan. 30, 1996

[54] METHOD AND SYSTEM FOR CONTROLLING REAR WHEEL ANTI-LOCK BRAKE CONTROL ON FOUR-WHEEL DRIVE VEHICLES BRAKING ON HIGH MU SURFACES

[75] Inventor: Dan Negrin, Wiesbaden, Germany

[73] Assignee: Kelsey-Hayes Company, Livonia, Mich.

[21] Appl. No.: 403,428

[22] Filed: Mar. 14, 1995

Related U.S. Application Data

[63] Continuation-in-part of Ser. No. 303,453, Sep. 9, 1994, abandoned.
[51] Int. Cl.[6] .................................................... B60T 8/64
[52] U.S. Cl. ........................................ 303/149; 303/190
[58] Field of Search .................................... 303/100, 103, 303/94, 111, 109, 113.5, 9.62, 105; 180/244, 248

[56] References Cited

U.S. PATENT DOCUMENTS

| | | | |
|---|---|---|---|
| 4,765,429 | 8/1988 | Sato | 303/111 X |
| 4,790,607 | 12/1988 | Atkins | 303/100 X |
| 4,893,880 | 1/1990 | Arikawa | 303/113.5 |
| 5,012,884 | 5/1991 | Sato | 303/111 X |
| 5,358,319 | 10/1994 | Negrin | 303/111 X |

Primary Examiner—Robert J. Oberleitner
Assistant Examiner—Lee W. Young
Attorney, Agent, or Firm—Brooks & Kushman

[57] ABSTRACT

A method and system for detecting a braking event on a high mu surface while in four-wheel drive and modifying the anti-lock brake control accordingly. The method includes determining whether the vehicle is braking on a high mu surface and inhibiting brake pressure application to the rear wheels until it is determined the vehicle is braking on a high mu surface. The system includes wheel speed sensors, an electronic control unit and control valves for carrying out the method.

20 Claims, 3 Drawing Sheets

5,487,596

METHOD AND SYSTEM FOR CONTROLLING REAR WHEEL ANTI-LOCK BRAKE CONTROL ON FOUR-WHEEL DRIVE VEHICLES BRAKING ON HIGH MU SURFACES

REFERENCE TO RELATED APPLICATION

This application is a continuation-in-part of United States application Ser. No. 08/303,453, filed Sept. 9, 1994, now abandoned.

TECHNICAL FIELD

This invention relates to anti-lock brake control for four-wheel drive vehicles braking on high mu surfaces.

BACKGROUND ART

As is well known in the art, wheel lock-up and vehicle skidding can be caused by severe slippage between the wheel and the driving surface. In many cases, lock-up increases required stopping distances and reduces directional control of the vehicle.

Such problems have been generally addressed with the advent of antilock brake systems (ABS). A typical ABS is designed to identify an excessive wheel slip condition by comparing the measured velocity of a wheel to a reference speed, which is an estimate of the true vehicle speed based on current and previous values of individual wheel velocities. If the velocity of a particular wheel is significantly less than the reference speed, then that wheel is determined to be experiencing excessive slip. In response, hydraulic pressure actuating a corresponding brake is modulated to reduce brake torque, thereby reducing braking force between the wheel and driving surface which, in turn, reduces wheel slip.

In practice, ABS first isolates existing brake fluid in an individual wheel brake from increasing brake fluid pressure in the master cylinder in order to hold pressure in the brake constant. ABS then dumps fluid from the brake to reduce pressure therewithin. Thereafter, ABS typically holds pressure in the brake constant for a selected amount of time.

After a period of constant pressure following pressure reduction, pressure is then increased until excessive wheel slip occurs again. The resulting cycle of decreasing, maintaining, and then increasing pressure is repeated until excessive slip no longer occurs. The specifics of this brake pressure cycle depend on the particular algorithm employed within the ABS logic control unit, along with vehicle characteristics and the driving surface conditions encountered at the time of braking.

One parameter which represents driving surface conditions is the coefficient of friction, commonly denoted by mu. Two classes of surfaces can be defined qualitatively in terms of mu. A high mu surface is one wherein relatively good braking ability is possible, such as dry asphalt. A low mu surface is one wherein relatively poor braking ability is possible, such as a snow or ice-covered road, or wet asphalt.

In relative terms, the coefficient of friction, mu, can also be expressed as a variation from a current or reference mu. Specifically, a higher mu surface is a surface whose mu is greater than the reference and a lower mu surface is a surface whose mu is less than the reference.

Vehicles with hard-coupled, four-wheel drive (4 wd) systems require special control by the ABS. For example, one known prior art system initiates the application of brake pressure to all the wheels during an ABS event, and then removes brake pressure from the rear wheels if a low mu or mid mu surface is detected based on external sensors. In this system, torque transfer problems, as is known in the art, occur when brake pressure is applied to the rear wheels while the vehicle is braking on a low mu or mid mu surface before the system determines the surface coefficient.

A second known prior art system controls the ABS braking event when in four-wheel drive by utilizing only the front channels and maintaining a low brake pressure on the rear brakes. However, this is not desirable on a high mu surface since brake torque produced by the front brakes is insufficient to cause significant slip when all four wheels are on high mu, resulting in the under utilization of the surface adhesion.

Therefore, a need exists for an anti-lock brake system to detect braking on a high mu surface during four-wheel drive in order to initiate full rear pressure control.

DISCLOSURE OF THE INVENTION

It is a general object of the present invention to provide a method and system for detecting a braking event on high mu surfaces while in four-wheel drive.

It is another object of the present invention to provide a method and system for controlling rear wheel anti-lock braking on a high mu surface while in four-wheel drive.

In carrying out the above objects and other objects of the present invention, a method is provided for detecting a high mu surface during an ABS event while in four-wheel drive and controlling rear wheel anti-lock braking accordingly. The method includes the steps of determining whether the vehicle is braking on a high mu surface and inhibiting application of brake pressure to the rear wheels until the vehicle is braking on a higher mu surface.

In further carrying out the above objects and other objects of the present invention, a system is also provided for carrying out the steps of the above-described method.

The above objects, features and advantages of the present invention, as well as others, are readily apparent from the following detailed description of the best mode for carrying out the invention when taken in connection with the accompanying drawings.

BEST MODE FOR CARRYING OUT THE INVENTION

Figure 1:
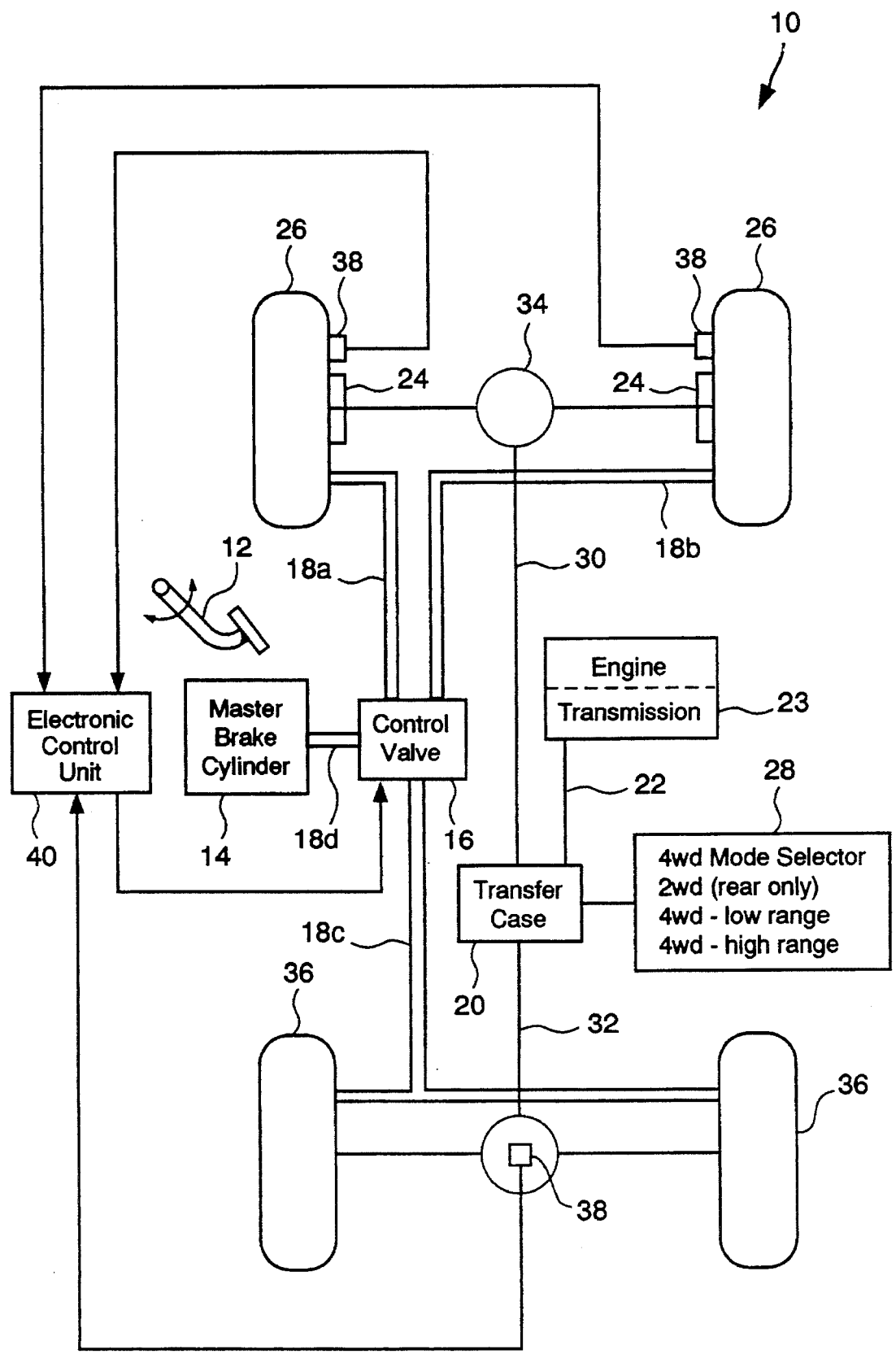
FIG. 1 is a schematic diagram of an anti-lock brake system for use with the present invention.

Referring now to FIG. 1, there is shown a schematic diagram of the ABS control system of the present invention, designated generally by reference numeral 10. The control system 10 includes a brake pedal 12, a master brake cylinder 14, a control valve 16, and brake fluid conduits 18a, 18b, 18c and 18d.

As shown, the control system 10 is utilized with a hard-coupled four-wheel drive vehicle. When operated in a two-wheel drive (2 wd) mode, the transfer case 20 is uncoupled from the output shaft 22 of the transmission 23, and the hubs 24 on the front wheels 26 are unlocked, allowing the front wheels 26 to turn freely.

A change from 2 wd to 4 wd can be initiated by the operator by manually selecting a 4wd mode from the 4 wd mode selector 28 (either high or low range). In response to this selection, the transfer case 20 is locked providing a hard coupling between the transmission output shaft 22, the front drive shaft 30 and the rear drive shaft 32. When shifted into 4 wd, the front wheel hubs 24 are automatically locked to connect each front wheel 26 to the front differential 34.

The transfer case 20 does not include a differential. Thus, the 4 wd mode is only intended for operation on snow, ice or other low coefficient of friction (mu) surfaces. The hard coupling between the front wheels 26 and rear wheels 36 via transfer case 20 causes wheel scrub during turns on high mu surfaces.

As illustrated in FIG. 1, the control system 10 of the present invention includes three vehicle wheel speed sensors, shown generally by reference numeral 38, which function to measure the velocity of each of the front wheels 26 and the rear wheels 36. It should be understood that the present invention is not limited to a particular number of sensors.

The control system 10 also includes an ABS electronic control unit (ECU) 40. Each of the wheel sensors 38, as well as other well-known sensors not specifically illustrated for the sake of clarity, are in electrical communication with the ECU 40 for transmitting input signals to the ECU 40 for use in accordance with the present invention, as described in greater detail below. The ECU 40, in turn, is itself in electrical communication with the ABS control valve 16. Although interconnections have been described as being electrical, it should be appreciated that other forms of connection, such as fiber optics, are possible.

For purposes of this discussion, the ECU 40 includes electronic componentry and executes software, permitting the ECU 40 to control the ABS according to the algorithm of the present invention. In the preferred embodiment, the ECU 40 includes a commercially available microprocessor. In general, the ECU 40 operates to determine both local and global control objectives, to activate the apply or dump valves, to control pressure or to hold pressure at its current level. For example, the ECU 40 functions as control means for determining a slip threshold and a departure depth, and for actuating ABS control valve 16 when the departure depth exceeds the slip threshold. ABS control valve 16 provides for regulation of the brake fluid pressure from the master brake cylinder 14 to the individual brakes (not specifically shown) of each of the wheels 26 and 36 via the brake fluid conduits 18a, 18b, 18c and 18d. Activation of control valve 16 isolates the individual vehicle wheel brakes in the hydraulic brake circuit from the master cylinder 14, thereby halting any increase in brake fluid pressure in the vehicle wheel brakes and preventing incipient wheel lockup.

Figure 2:
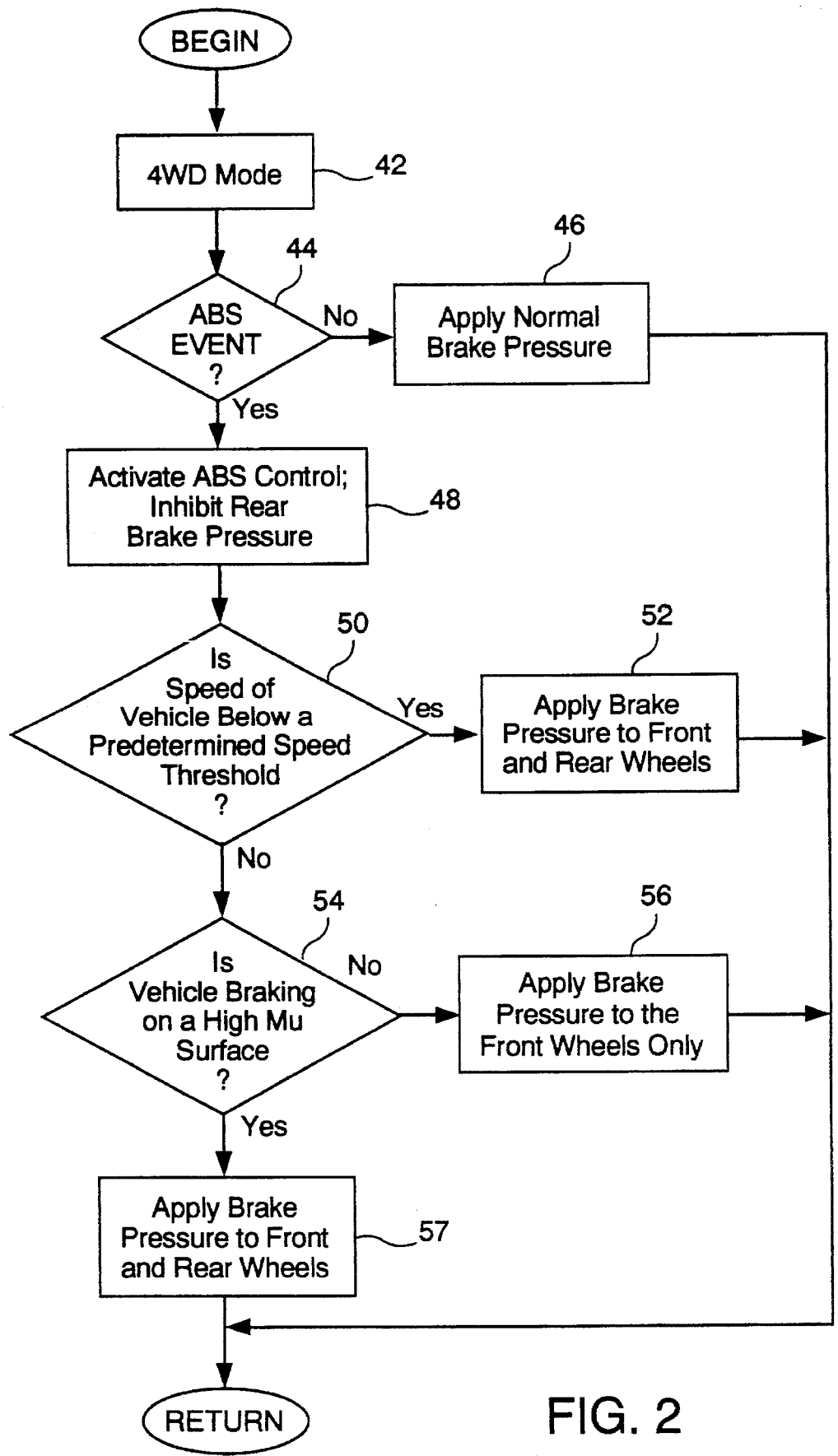
FIG. 2 is a block diagram illustrating the general sequence of steps associated with the operation of the present invention.

Turning now to FIG. 2, there is shown a flow chart illustrating the general sequence of steps associated with the operation of the present invention. As seen therein, the method of the present invention is invoked when a vehicle is in four-wheel drive, as shown by block 42. The method begins with the initial step of determining whether the vehicle is experiencing an ABS event as shown by conditional block 44.

If the vehicle is not experiencing an ABS event, normal brake pressure is applied to the wheels as shown by block 46. Therefore, brake pressure is applied to the wheels per the vehicle operator's control. If, however, the vehicle is experiencing an ABS event, ABS control is activated and brake pressure increase is removed from the rear wheels as shown by block 48.

The method then continues with the step of determining whether the speed of the vehicle is below a predetermined speed threshold as shown by conditional block 50. The predetermined speed threshold is approximately eight to ten miles per hour. If the speed of the vehicle is below the predetermined threshold, brake pressure is applied to the rear wheels, as well as the front wheels, as shown by block 52.

If, however, the speed if the vehicle exceeds the predetermined speed threshold, the method continues with the step of determining whether the vehicle is braking on a high mu surface, as shown by conditional block 54. A high mu surface is generally detected if the speed of one of the front wheels has exceeded the predetermined slip threshold for a relatively short period of time, as will be discussed in greater detail below.

If the vehicle is not braking on a high mu surface, brake pressure is applied to the front wheels only, as shown by block 56. However, if the vehicle is braking on a high mu surface, rear brake pressure is applied, as shown by block 57 to both the front and rear wheels in order to fully utilize the surface adhesion of the road.

Brake pressure is applied to the rear wheels based on the difference between the sensed wheel speeds and the vehicle speed. As the difference between the sensed wheel speeds and the vehicle speed decreases, brake pressure to the rear wheels is increased. On the other hand, as the difference between the sensed wheel speeds and the vehicle speed increases, brake pressure to the rear wheels is decreased.

Figure 3:
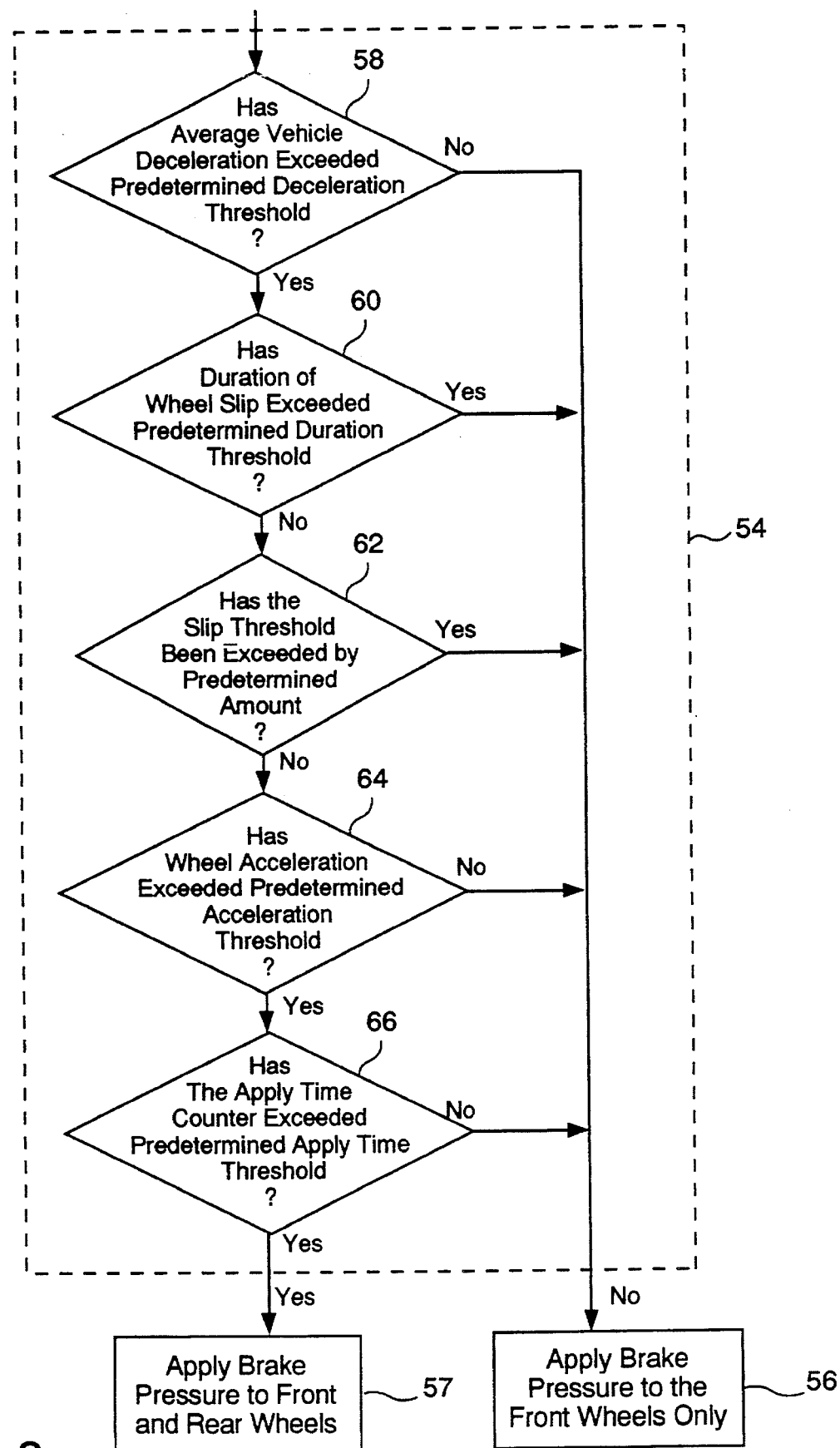
FIG. 3 is a block diagram illustrating the general sequence of steps associated with detecting a high mu surface braking event while in four-wheel drive.

Referring now to FIG. 3, there is shown a block diagram illustrating the specific sequence of steps associated with the step of determining whether the vehicle is braking on a high mu surface, as represented generally by decision block 54 in FIG. 2. As seen in FIG. 3, the first step in detecting a high mu surface includes determining whether the average vehicle deceleration has exceeded a predetermined deceleration threshold as shown by conditional block 58. The predetermined deceleration threshold is representative of a level which can only be achieved on a high mu surface, and is preferably set to 0.7 g. If the average vehicle deceleration is less than 0.7 g, a low to mid mu surface is detected and brake pressure is applied to the front wheels only, as shown by block 56.

If, however, the average vehicle deceleration has exceeded 0.7 g, a high mu surface may exist and the method continues with determining whether the duration of the wheel slip has exceeded a predetermined slip duration threshold as shown by conditional block 60. The wheel slip duration is a real-time value indicating the amount of time that a wheel is determined to be in slip, or the amount of time that the wheel speed remains below the predetermined slip threshold. The predetermined slip duration threshold is selected to represent a long departure, characteristic of a low mu surface, and is experimentally devised based on previously determined mid to high mu departure times. In the preferred embodiment, the predetermined duration threshold is 150 ms. If the duration of the wheel slip has exceeded 150 ms, a low to mid mu surface is detected and brake pressure is applied to the front wheels only, as shown by block 56.

However, if the duration of the wheel slip has not exceeded 150 ms, a high mu surface may exist, and the method continues with the step of determining whether the slip threshold has been exceeded by a predetermined amount, e.g., 25 percent, as shown by conditional block 62. The predetermined amount is representative of a level of slip depth which is generally only achieved on low mu surfaces. If the slip threshold has been exceeded by 25 percent, a low to mid mu surface is again detected, and the method proceeds to step 56 in which brake pressure is applied to the front wheels only.

If, however, the slip threshold has not been exceeded by 25 percent, a high mu surface may exist, and the method continues with the step of determining whether the wheel acceleration has exceeded a predetermined acceleration threshold, as shown by conditional block 64. The predetermined acceleration threshold is set at 4 g's, and is characteristic of quick wheel recovery which generally occurs only on high mu surfaces. If the wheel acceleration has not exceeded 4 g's, then a low to mid mu surface is detected, and the method continues to step 56 in which brake pressure is applied to the front wheels only.

However, if the wheel acceleration has exceeded 4 g's, a high mu surface may exist and the method continues with the step of determining whether the apply time counter has exceeded a predetermined apply time threshold, as shown by conditional block 66. The apply time is the real time value indicating the amount of time that brake pressure is applied to a wheel once it has recovered from a departure. The predetermined apply time threshold is representative of a wheel that remains stable, which generally occurs only on high mu surfaces. In the preferred embodiment, the predetermined apply time threshold is set to 200 ms. If the apply time counter has not exceeded 200 ms, a low to mid mu surface is detected, and the method continues with the step of applying brake pressure to the front wheels only, as shown by block 56. However, if the apply time counter has exceeded 200 ms, a high mu surface is detected, and brake pressure is applied to both the front and rear wheels, as shown by block 57.

While the best modes for carrying out the invention have been described in detail, those familiar with the art to which this invention relates will recognize various alternative designs and embodiments for practicing the invention as defined by the following claims.

What is claimed is:

1. A method for controlling an antilock brake system in a four-wheel drive vehicle having front and rear wheels during an anti-lock braking event, the method comprising:

determining whether the vehicle is braking on a high mu surface; and inhibiting application of brake pressure to the rear wheels until the vehicle is braking on a high mu surface.

2. The method of claim 1 further comprising:

determining a vehicle speed;

comparing the vehicle speed to a predetermined speed threshold; and applying brake pressure to the rear wheels prior to determining the vehicle is braking on a high mu surface if the vehicle speed does not exceed the predetermined speed threshold.

3. The method of claim 1 wherein brake pressure to the rear wheels is increased as the difference between a sensed wheel speed and a vehicle speed decreases.

4. The method of claim 1 wherein brake pressure to the rear wheels is decreased as the difference between a sensed wheel speed and a vehicle speed increases.

5. The method of claim 1 wherein the step of determining whether the vehicle is braking on a high mu surface is performed based on a sensed wheel speed.

6. The method of claim 5 wherein the step of determining whether the vehicle is braking on a high mu surface comprises:

determining an average vehicle deceleration; and determining whether the average vehicle deceleration exceeds a predetermined acceleration threshold.

7. The method of claim 6 further comprising:

determining a wheel slip duration; and determining whether the wheel slip duration exceeds a predetermined duration threshold.

8. The method of claim 7 further comprising:

determining a slip threshold; and determining whether the slip threshold has been exceeded by a predetermined amount.

9. The method of claim 8 further comprising:

determining a wheel acceleration; and determining whether the wheel acceleration exceeds a predetermined acceleration threshold.

10. The method of claim 9 further comprising:

determining an apply time count representing the amount of time brake pressure has been applied to at least one of the front wheels; and determining whether the apply time count exceeds a predetermined apply time threshold.

11. A system for controlling an antilock brake system in a four-wheel drive vehicle having front and rear wheels during an antilock braking event, the control system comprising:

means for determining whether the vehicle is braking on a high mu surface; and means for inhibiting application of brake pressure to the rear wheels until the vehicle is braking on a high mu surface.

12. The system of claim 11 further comprising:

means for determining a vehicle speed;

means for comparing the vehicle speed to a predetermined speed threshold; and means for applying brake pressure to the rear wheels prior to determining the vehicle is braking on a high mu surface if the vehicle speed does not exceed the predetermined speed threshold.

13. The system of claim 11 wherein brake pressure to the rear wheels is increased as the difference between a sensed wheel speed and a vehicle speed decreases.

14. The system of claim 11 wherein brake pressure to the rear wheels is decreased as the difference between a sensed wheel speed and a vehicle speed increases.

15. The system of claim 11 wherein the means for determining whether the vehicle is braking on a high mu surface is performed based on a sensed wheel speed.

16. The system of claim 15 wherein the means for determining whether the vehicle is braking on a high mu surface comprises:

means for determining an average vehicle deceleration; and means for determining whether the average vehicle deceleration exceeds a predetermined acceleration threshold.

17. The system of claim 16 further comprising:

means for determining a wheel slip duration; and means for determining whether the wheel slip duration exceeds a predetermined duration threshold.

18. The system of claim 17 further comprising:
means for determining a slip threshold; and
means for determining whether the slip threshold has been exceeded by a predetermined amount.

19. The system of claim 18 further comprising:
means for determining a wheel acceleration; and
means for determining whether the wheel acceleration exceeds a predetermined acceleration threshold.

20. The system of claim 19 further comprising:
means for determining an apply time count representing the amount of time brake pressure has been applied to at least one of the front wheels; and
means for determining whether the apply time count exceeds a predetermined apply time threshold.

* * * * *